June 27, 1933.   H. NYQUIST   1,915,441

SYSTEM FOR DETERMINING THE GAIN OF VACUUM TUBES

Filed May 1, 1930

INVENTOR
H. Nyquist
BY
ATTORNEY

Patented June 27, 1933

1,915,441

UNITED STATES PATENT OFFICE

HARRY NYQUIST, OF MILLBURN, NEW JERSEY, ASSIGNOR TO AMERICAN TELEPHONE AND TELEGRAPH COMPANY, A CORPORATION OF NEW YORK

SYSTEM FOR DETERMINING THE GAIN OF VACUUM TUBES

Application filed May 1, 1930. Serial No. 449,038.

This invention relates to regenerative amplifying systems and particularly to a method and means for determining whether the gain attainable by a vacuum tube lies within a predetermined range of values.

I have found it possible to construct a circuit with what might be termed a standard tube that will oscillate throughout a given range of gain, but which will not oscillate if the gain is above or below the given range.

My invention resides in the application of that principle to a system for measuring the gain of vacuum tubes by which it is possible to determine whether the gain derivable from a certain tube lies within certain limits.

Figure 1:
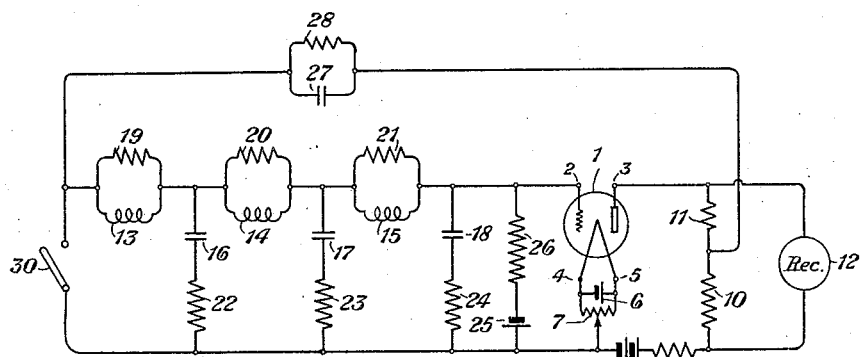
Figure 2:
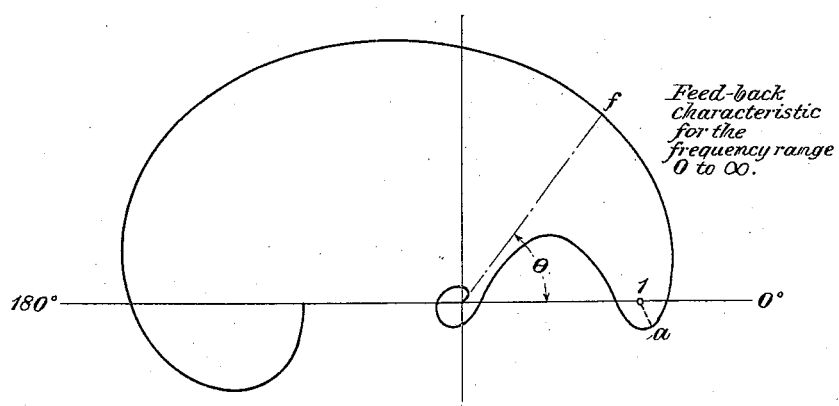

My invention will be clearly understood from the following description when read in connection with the attached drawing of which Figure 1 shows schematically an arrangement embodying my invention, and Fig. 2 is a characteristic of the circuit shown in Fig. 1 that serves to illustrate the description of the underlying principle of the invention.

In Fig. 1, 1 represents a vacuum tube having plate, filament and grid electrodes. The small circles 2, 3, 4 and 5 represent contact points of a socket by means of which the tube 1 or other similar tubes may be connected with the circuit of Fig. 1. Connected with the points 4 and 5 is a source 6 of current for heating the filament of the tube that is connected with the said points. A variable resistance 7 is connected across the source 6 to afford a desirable way to connect the filament with the other parts of the circuit. The output circuit includes a source of plate voltage 8, resistances 9, 10 and 11 and a telephone receiver 12, or other equivalent device. The input circuit includes a plurality of inductances 13, 14 and 15 connected in series with the said circuit and a plurality of condensers 16, 17 and 18 connected in shunt across the said circuit. Each of the inductance coils is shunted by one of the resistances 19, 20 and 21, and each of the condensers has connected in series therewith one of the resistances 22, 23 and 24. A source of negative biasing voltage 25 is connected through the resistance 26 with the grid of the tube. A feed-back connection extends from the output circuit to the input circuit and contains the coupling condenser 27 that is shunted by the resistance 28. The combination of the series inductances and the shunt condensers, constitutes a low-pass filter. Such combination would ordinarily have an undesired effect upon the phase angle at very high frequencies, but I have found that by employing resistances in shunt with the inductance coils and in series with the condensers, the phase angles at the high frequencies may be readily controlled.

If a circuit is constructed as shown in Fig. 1, and the constants of the circuit are properly proportioned, it will be found that the characteristic of that circuit, representing the locus of the points corresponding to the feed-back ratio and phase angles for successive values of frequency from zero to plus infinity, will be as shown in Fig. 2. In that figure each point on the curve represents one of the frequencies stated, the radius vector represents the magnitude and the phase angle of the feed-back ratio, and the phase angle for each frequency within the limits stated. That is to say, the length of the line extending from the point marked $f$ to the origin represents the feed-back ratio at the frequency $f$, and the angle $\theta$ represents the phase angle that the current fed back makes with respect to the input current. The point marked by the numeral 1 represents unity feed-back ratio wherein the current fed back is in phase with the input current. As pointed out in my co-pending application, Serial No. 449,037 filed May 1, 1930, in which means for determining feed-back ratio are explained, I have found that the circuit is stable, that is, it will not sing if zero total angle is generated by a straight line of variable length with one end pivoted at the point 1, while the other end "$a$" follows the curve of the feed-back characteristic from zero to infinite frequency; and that the circuit is unstable, that is, it will sing if the total angle generated in this manner by the line pivoted at point 1 is not zero. By varying the gain of a given circuit its feed-back characteristics may be shifted to that the curve will lie on one side or the other of the point 1, and the total angle generated by the line rotating in the manner described will, at the same time, change from a finite value to zero or vice versa. Thus a circuit which was formerly in an unstable oscillating condition may be changed to one of stable condition or vice versa, by suitable variation in the magnitude of the feed-back ratio so that its curve sweeps past the point 1.

I have employed that principle in a system for testing the gain of vacuum tubes. If, for example, in the circuit shown in Fig. 1 the constants of the circuit be properly adjusted for a given tube, the feed-back characteristic will be as represented in Fig. 2 in which the point 1 representing unity feed-back ratio is located so that the angle generated by the line 1—$a$ as "$a$" follows the curve from zero to infinite frequency, is 360°. The circuit will therefore be unstable and oscillations will be detected by the receiver 12. If the tube to be tested is inserted in the circuit of Fig. 1 in place of the standard tube, and oscillations are produced, such result indicates that the gain produced by the tube under test lies within the range of gain for which the circuit was adjusted. If, on the other hand, the circuit fails to oscillate it indicates that the gain is above or below the said range; and if the feed-back characteristic were then plotted it would be found that the point representing unity ratio was on the other side of the curve so that the line 1—$a$ generated zero total angle as "$a$" follows the entire curve.

It will be seen that by means of the arrangement and method herein described, it is possible to determine whether the gain of a vacuum tube lies within or without a given range of gain, merely by observing whether the circuit oscillates or not. In case the gain of the tube lies without the given range the circuit of Fig. 1 will not oscillate.

It is evident that a regenerative circuit could also be designed to sing if the tube under test shows a gain outside the allowable limits, and to be stable if the tube is within limits. When the tube is first turned on, it is conceivable that the tube might start singing while the filament is still relatively cold and that this singing might so alter the gain characteristic of the tube that it might continue to sing. In order to obviate this difficulty, it is preferable to place across the circuit at some point a shunt having a switch 30 therein that can be opened after it is certain that the filament has attained its final temperature.

It is to be understood that the form in which the invention is disclosed is purely schematic, and that it is capable of embodiment in other and different forms without departing from the spirit and scope of the appended claims.

What is claimed is:

1. A gain testing circuit for vacuum tubes comprising an input circuit including a low-pass filter, an output circuit including an indicating device, a feed-back circuit between said input and output circuits, a standard vacuum tube, a tube to be tested, and means to connect each of the said vacuum tubes with the said input and output circuits, the said circuits being so adjusted as to oscillate for a particular range of gain of the said standard vacuum tube, and not to oscillate if the gain is greater or less than the said range for which the circuit is adjusted, even though the feed-back ratio is greater than unity and the current fed back is in phase.

2. In a circuit for testing the gain of vacuum tubes, the combination with a vacuum tube of an input circuit including a low-pass filter comprising series inductance coils and shunt condensers, the said coils being shunted by resistances and the said condensers having resistances in series therewith, an output circuit having an indicating device connected therewith, a feed-back connection between the said output and input circuits, the said connection including a condenser shunted by a resistance, and means to energize the filament of the said tube and to supply positive plate voltage and negative grid voltage thereto.

3. A circuit such as that set forth in claim 2 characterized by the adjustment of its elements so that its feed-back characteristic representing the locus of the points corresponding to the feed-back ratio and phase angle for the range of frequencies from zero to plus infinity shall be a curve such that an angle other than zero is generated by a straight line of variable length, one end of which is pivoted at the point of unity feed-back ratio and zero angle, while the other end traces the entire locus curve of the feed-back characteristic.

4. In a regenerative amplifier having an input circuit including a low-pass filter, an output circuit including an indicating device, and a feed-back connection between the output and input circuits, the method which consists in producing oscillations with a tube of known characteristics and determining the range of gain therewith, then substituting for the known tube the tube to be tested and determining by the presence of oscillations whether the gain attainable by the latter tube falls within the known range.

In testimony whereof, I have signed my name to this specification this 30th day of April 1930.

HARRY NYQUIST.